(12) United States Patent
Binder et al.

(10) Patent No.: US 9,534,674 B2
(45) Date of Patent: *Jan. 3, 2017

(54) CAMSHAFT HAVING AN AXIALLY DISPLACEABLE CAM PACK

(75) Inventors: Thomas Binder, Feldkirch (AT); Peter Wiesner, Mauren (LI)

(73) Assignee: Thyssenkrupp Presta Teccener AG, Eschen (LI)

( * ) Notice: Subject to any disclaimer, the term of this patent is extended or adjusted under 35 U.S.C. 154(b) by 5 days.

This patent is subject to a terminal disclaimer.

(21) Appl. No.: 14/130,100

(22) PCT Filed: Jun. 29, 2012

(86) PCT No.: PCT/EP2012/062688
§ 371 (c)(1),
(2), (4) Date: Jan. 30, 2014

(87) PCT Pub. No.: WO2013/001058
PCT Pub. Date: Jan. 3, 2013

(65) Prior Publication Data
US 2014/0144401 A1 May 29, 2014

(30) Foreign Application Priority Data

Jun. 30, 2011 (DE) .................. 10 2011 051 480

(51) Int. Cl.
*F01L 1/34* (2006.01)
*F16H 25/10* (2006.01)
(Continued)

(52) U.S. Cl.
CPC ............ *F16H 25/10* (2013.01); *B21D 53/845* (2013.01); *B22D 19/00* (2013.01); *F01L 1/047* (2013.01);
(Continued)

(58) Field of Classification Search
CPC ................ F01L 1/34; F01L 2001/0473; F01L 2013/0052; F16H 25/08; F16H 25/10; F16H 53/025
(Continued)

(56) References Cited

U.S. PATENT DOCUMENTS 1,512,034 A 10/1924 Luitwieler
5,041,253 A 8/1991 Husted
(Continued)

FOREIGN PATENT DOCUMENTS

CH 694277 A 10/2004
DE 4004505 A1 8/1991
(Continued)

OTHER PUBLICATIONS

Elendt et al., Camshaft for a Variable Lift Valve Train of an Internal Combustion Engine, US Patent Application Pub. US 2010/0108006 A1, May 6, 2010.*

*Primary Examiner* — Ching Chang
(74) *Attorney, Agent, or Firm* — Laurence A. Greenberg; Werner H. Stemer; Ralph E. Locher

(57) ABSTRACT

A camshaft includes a carrier shaft which can be mounted rotatably along a shaft axis and at least one cam pack disposed axially displaceably on the carrier shaft. The cam pack includes at least two cams and at least one adjusting member for axial adjustment of the cam pack. The cams and the at least one adjusting member are connected to one another in an axially adjacent configuration and can be mounted axially displaceably as a composite structure in a direct configuration on the carrier shaft. A method for producing a camshaft and a cam pack are also provided.

16 Claims, 6 Drawing Sheets

(51) Int. Cl.
*B21D 53/84* (2006.01)
*F01L 1/047* (2006.01)
*F16H 53/02* (2006.01)
*B22D 19/00* (2006.01)
*F16H 25/08* (2006.01)
*F01L 13/00* (2006.01)

(52) U.S. Cl.
CPC ............... *F01L 1/34* (2013.01); *F16H 25/08* (2013.01); *F16H 53/025* (2013.01); *F01L 2001/0473* (2013.01); *F01L 2013/0052* (2013.01); *Y10T 29/49293* (2015.01); *Y10T 74/2101* (2015.01); *Y10T 74/2102* (2015.01)

(58) Field of Classification Search
USPC .......................................... 123/90.18, 90.16
See application file for complete search history.

(56) References Cited

U.S. PATENT DOCUMENTS

| | | | |
|---|---|---|---|
| 7,305,953 | B2 | 12/2007 | Walz |
| 7,513,232 | B2 | 4/2009 | Schneider |
| 8,544,430 | B2 | 10/2013 | Elendt et al. |
| 8,584,639 | B2 | 11/2013 | Elendt et al. |
| 8,607,749 | B2 | 12/2013 | Bechtold |
| 8,746,195 | B2 | 6/2014 | Werler et al. |
| 8,887,681 | B2 | 11/2014 | Wiesner et al. |
| 9,261,177 | B2 * | 2/2016 | Binder ................. B21D 53/845 74/567 |
| 9,273,765 | B2 * | 3/2016 | Binder ................. B21D 53/845 123/90.16 |
| 2006/0266492 | A1 | 11/2006 | Wu |
| 2011/0185995 | A1 | 8/2011 | Deblaize et al. |

FOREIGN PATENT DOCUMENTS

| | | | |
|---|---|---|---|
| DE | 9313056 | U1 | 11/1993 |
| DE | 102004009074 | B3 | 7/2005 |
| DE | 102004022849 | A1 | 12/2005 |
| DE | 102007022145 | A1 | 1/2008 |
| DE | 202009015465 | U1 | 2/2010 |
| DE | 102008064340 | A1 | 6/2010 |
| DE | 102009030373 | A1 | 12/2010 |
| DE | 102009022657 | A1 | 1/2011 |
| DE | 102009052222 | A1 | 5/2011 |
| DE | 102009055868 | A1 | 6/2011 |
| DE | 102010004579 | A1 | 7/2011 |
| DE | 102010004591 | A1 | 7/2011 |
| DE | 102010060766 | A1 | 5/2012 |
| EP | 0723094 | A2 | 7/1996 |
| EP | 1754913 | A2 | 2/2007 |
| JP | S5639356 | A | 4/1981 |
| WO | 2008012306 | A1 | 1/2008 |
| WO | 2010012371 | A1 | 2/2010 |
| WO | WO 2010142408 | A1 * | 12/2010 ........... B21D 53/845 |
| WO | 2011018075 | A2 | 2/2011 |
| WO | 2011072782 | A1 | 6/2011 |

* cited by examiner

CAMSHAFT HAVING AN AXIALLY DISPLACEABLE CAM PACK

BACKGROUND OF THE INVENTION

Field of the Invention

The invention relates to a camshaft with a carrier shaft which can be mounted rotatable in a shaft axis, wherein at least one cam pack is disposed axially displaceable on the carrier shaft, and wherein the cam pack comprises at least two cams and at least one adjusting member for the axial adjustment of the cam pack.

Such camshafts are used for internal combustion engines, which can be operated with an adjustable valve lift or with adjustable valve control times. The valves of the internal combustion engine are controlled by means of cam packs, which are disposed axially displaceable on the rotating carrier shaft. The valves can be controlled with different cams by the axial displacement of the cam pack on the carrier shaft, wherein the different cams can have different cam shapes. The cam lobes can be more or less geometrically pronounced or the position of the cam lobes can be varied relative to one another in the circumferential direction. Cams are also known that are constituted as zero-lift cams.

Cam packs comprise a plurality of cams, wherein at least one adjusting member is a component of the cam pack, by means of which the axial displacement is introduced into the cam pack.

There is known from DE 10 2009 022 657 A1 a camshaft with a carrier shaft, which can be mounted rotatable in the shaft axis in order to be operated in an internal combustion engine. Disposed on the carrier shaft is a cam pack, which is constituted for example by four cams. The cam pack comprises a carrier tube, which is disposed axially displaceable on the carrier shaft by means of an inner toothing and an outer toothing, so that the rotary motion of the carrier shaft is transmitted via a geometrical form-fit connection to the carrier tube. A plurality of cams is disposed on the carrier tube, so that the cam pack comprises four cams with two different cam contours. For the axial displacement of the cam pack, the carrier tube comprises axial stops, in which curved paths are introduced on the external periphery, said curved paths being able to cooperate with a transmission element.

DE 10 2004 011 586 A1 shows a further camshaft with a carrier shaft, and a carrier tube is shown which is constituted in one piece with a plurality of cams. The carrier tube comprises an inner toothing, which engages with an outer toothing of the carrier shaft in order to dispose the cam pack in an axially displaceable manner on the carrier shaft, and at the same time to produce a rotary transmission of the carrier shaft to the cam pack by means of a geometrical form-fit connection. The carrier tube comprises a bearing element between the cam contours in order to mount the cam pack rotatable in a bearing block, which can for example be a component of the cylinder head.

The camshafts according to the prior art disadvantageously comprise cam packs which necessitate a carrier tube in an assembled variant in order to combine various control elements and adjusting members with a cam pack, or which have to be produced in solid form. The carrier tube serves for the mounting on the carrier shaft and comprises the necessary inner toothing which can engage with the outer toothing on the carrier shaft. Disadvantageously, an expensive design arises due to the use of a carrier tube for mounting the cams and adjusting members, and the cams have to be disposed with a necessary jointing technique on the carrier tube. If the carrier tube and the cams and also, for example, the adjusting member are constituted as a whole in one piece, a component arises which is expensive to produce and on which a large number of processing operations have to be carried out. However, it is technically advantageous to be able to carry out individually both the machining and heat treatment of various elements of the cam pack.

BRIEF SUMMARY OF THE INVENTION

The object of the present invention consists in providing a camshaft with a cam pack, which overcomes the aforementioned drawbacks of the prior art and has a simple structure, wherein the various elements of the cam pack can also be machined and heat-treated individually.

This object is solved proceeding from a camshaft including a carrier shaft which can be mounted rotatably along a shaft axis and at least one cam pack or package disposed axially displaceably on the carrier shaft and having at least two cams and at least one adjusting member for axial adjustment of the cam pack. The cams and the at least one adjusting member are connected to one another in an axially adjacent configuration and can be mounted axially displaceably as a composite structure in a direct configuration on the carrier shaft. Advantageous developments of the invention are given in the dependent claims.

The invention includes the technical teaching that the cams and the at least one adjusting member are connected to one another in an axially adjacent arrangement and can be mounted axially displaceable as a composite structure in a direct arrangement on the carrier shaft.

The invention proceeds from the idea of connecting the individual control elements of the cam pack directly to one another in order to constitute the cam pack without the use of a carrier tube. As a result of the direct connection of the cams and of the at least one adjusting member to the cams disposed adjacent to the latter, in the general idea of the invention also each element participating in a cam pack, the use of a carrier tube becomes unnecessary, and the cams and the at least one adjusting member can be disposed axially displaceable directly on the carrier shaft. As a result of the direct connection of the cams to one another and of the adjusting member to the cams disposed adjacent to the latter, a composite structure of individual elements is created which can be machined individually before being connected jointly to one another. After the composite structure comprising the cams and the adjusting member has being created, the latter can be disposed directly on the carrier shaft without further use of a carrier tube or any other element.

The invention offers the particular advantage of constituting the cams and the adjusting member with an inner toothing, which can engage in an axially displaceable manner with an outer toothing of the carrier shaft and can at the same time transmit torques in the circumferential direction. The inner toothing is preferably introduced directly into the cams and/or into the adjusting member in order to dispose the cam pack already formed with the cams and/or the adjusting member in an axially movable and rotation-transmitting manner on the carrier shaft. As a further advantage, it is possible for example for only outer elements, for example a first outer cam and a mutually opposite second outer cam, to be constituted with an inner toothing, which can engage with a, for example, continuous outer toothing on the carrier shaft. The advantage is thus obtained that only two elements of the cam pack have to be constituted with an inner toothing, which preferably terminate the cam pack on the outside. Further elements of the cam pack, which are disposed between the elements disposed on the outside with the inner toothing, can optionally comprise further inner toothings.

As a further advantage, at least one latching groove can be introduced into at least one of the cams, but preferably in the adjusting member, said latching groove being able to cooperate with a latching means for the axial latching of the cam pack, said latching means being disposed in the carrier shaft. The latching means can for example be a spring-loaded ball, which is pressed into the latching grooves. Defined axial positions of the cam pack can thus be defined by the axial adjustment, wherein the number of latching grooves preferably corresponds to the number of cams of differing cam contour. The latching grooves can be introduced particular advantageously into elements of the cam pack that are not constituted with an inner toothing.

The cams and the adjusting member can be connected to one another at least over partial regions of their respective end faces. The end faces can be formed by plane faces, with which the shaft axis forms a surface normal. Once the cams and the adjusting member are brought flat one against the other in an axially adjacent arrangement, the connection can be made between the cams and/or the adjusting member. The connections can be constituted particularly advantageously as firmly bonded connections.

The firmly bonded connections between the cams and the at least one adjusting member and the cams adjacent thereto can be carried out by means of weld joints, and weld joints can be disposed for example on the outer periphery and/or on the inner periphery. The weld joints can be produced for example with a laser beam welding method or with an electron beam welding method, in order to minimize the thermally influenced material zone in the cams and/or in the adjusting member. Furthermore, the thermal distortion of the pack arrangement of the cam pack can be minimized by these welding methods. The weld joint can be produced particularly advantageously with the formation of a vapor capillary, in order to produce a particularly deep weld between the end faces of the cams and/or the adjusting member, so that the weld joint is capable of withstanding particularly high mechanical loads.

According to a possible embodiment of the invention, the firmly bonded connections between the cams and the at least one adjusting member can be carried out by means of solder joints and/or adhesive joints. In principle, finish machining of the functional surfaces of the cams and/or the adjusting member can take place after the firmly bonded connections are have been produced between the cams and/or the adjusting member.

As a further advantage, the connections between the cams to one another and the adjusting member to the cams disposed adjacent thereto can be constituted by at least one and preferably a plurality of tie rods distributed uniformly on the periphery of the cam pack, said tie rod or rods extending through the cams and the adjusting member. The tie rods can be constituted by threaded bolts or suchlike and can take up a tensile stress after arrangement in the cam pack. The cams and the adjusting member are consequently pressed axially against one another in order to form a mechanically loadable composite structure comprising the cams and the adjusting member. Alternatively, it is also conceivable to connect the cams to one another and the adjusting member to its adjacent cams by means of one or more rivet joints. As a further advantage, the cams and the adjusting member can for example be pinned together, or form-fit geometries can be provided on the end faces of the cams and the adjusting member in order then to pass the tie rods through the cams and the adjusting member and thus to place them under tensile stress.

As a further possible embodiment of the invention, the connections of the cams and of the at least one adjusting member to its adjacent cams can be constituted in each case by at least one jointing element acting in a form-fit manner which is preferably disposed on the cams and/or at least one adjusting member or is constituted between the end faces. The jointing elements acting in a form-fit manner can be constituted in one piece with the cams and/or the adjusting member or can even be molded onto the latter. For example, threaded joints, bayonet joints, undercut joints or other joints can be provided between the cams and/or the adjusting member, or jointing elements such as slot nuts or suchlike are provided. In principle, any possible connection embodiment can be provided between the cams and/or the adjusting member in order to connect the latter to one another in a mechanically loadable manner. The connection of the cams and/or the adjusting member should preferably be able to be produced free from play, and the connection should maintain the rotational position of the elements around the common shaft axis.

According to a further advantageous embodiment, at least one multiple cam element can be provided with at least two or preferably three cams with different cam shapes, and wherein at least one multiple cam element is connected in an axially adjacent arrangement to the adjusting member. Through the use of a multiple cam element with a plurality of cam shapes, the idea of the invention is furthered inasmuch as the cams are connected to one another by the one-part formation of the multiple cam element in an axially adjacent arrangement, wherein a firmly bonded jointing location is limited for example solely to the connection between one or two multiple cam elements and an adjusting member.

For example, the multiple cam element can comprise a jointing section, which can be introduced into a receiving bore of the adjusting member and/or which can be pushed onto a receiving section of the adjusting member. For example, the jointing section can be pressed into the receiving bore of the adjusting member in order thereby to form a mechanically loadable connection between the multiple cam element and the jointing section. A further possibility for connection can be to screw the adjusting member together with the multiple cam elements by providing an external thread on the jointing section and an internal thread in the receiving bore. The multiple cam element and the adjusting member can of course also be welded, soldered or for example glued to one another by the end faces turned towards one another in each case adjacent to one another. The firmly bonded jointing possibilities described above between cams and the adjusting member can also be used between the multiple cam element and the adjusting member.

Furthermore, there is the possibility of the adjusting member comprising a preferably radially circumferential jointing tongue at least on one end face, wherein the multiple cam elements comprises at least one jointing groove. The jointing tongue can be introduced, for example pressed, into the jointing groove to connect the multiple cam element to the adjusting member. In addition, firmly bonded jointing methods can be combined.

As a further advantage, the connection between the multiple cam element and the adjusting member can comprise a compression joint, a weld joint, a solder joint or an adhesive joint, and in particular provision can be made such that the connection between the jointing section and the receiving bore and/or the connection between the jointing tongue and the jointing groove is constituted as a compression joint.

According to a further advantageous embodiment, the cam pack can comprise at least one bearing element, which is preferably constituted for the formation of a zero-lift cam. A zero-lift cam comprises a cylindrical lateral surface, wherein the bearing element can have an axial width which enables both the bearing of the cam pack by means of the bearing element as well as the simultaneous active connection of the bearing element to a tappet of the valve control.

The invention further relates to a cam pack comprising at least two cams and at least one adjusting member for the axial adjustment of the cam pack on a carrier shaft, wherein the cams and the at least one adjusting member are connected to one another in an axially adjacent arrangement and are constituted as a composite structure for direct arrangement on the carrier shaft. The advantages and embodiments of the aforementioned camshaft with a corresponding cam pack are also taken into account for the generic cam pack.

The invention further relates to a method for producing a camshaft with a carrier shaft which can be mounted rotatable in a shaft axis, wherein at least one cam pack is disposed axially displaceable on the carrier shaft and wherein the cam pack comprises at least two cams and at least one adjusting member for the axial adjustment of the cam pack, wherein according to the invention the method comprises at least the steps of the mutual jointing of the cams and of the at least one adjusting member and the cams disposed adjacent to the latter in an axially adjacent arrangement and the direct arrangement of the composite structure on the carrier shaft.

The method can further comprise the introduction of an inner toothing into the cams and/or into the adjusting member in order to engage in an axially displaceable manner with an outer toothing on the carrier shaft. The inner toothing is introduced directly into the material of the cams and/or of the adjusting member. According to a further method step, there is introduced into at least one cam and/or into the adjusting member at least one latching groove, which can cooperate with a latching means, which is disposed in the carrier shaft, for the axial latching of the cam pack.

According to a possible embodiment of the method according to the invention, the inner toothing can be introduced in each case individually into the cams and into the adjusting member, the cams and the adjusting member only being mutually jointed subsequently in an axially adjacent arrangement.

Alternatively, the cams and the adjusting member can be mutually jointed in an axially adjacent arrangement, the inner toothing only then being introduced into the cams and into the adjusting member. In the same way, the at least one latching groove can be introduced before or after the jointing of the cams and the adjusting member with one another.

If a multiple cam element is provided, the method for producing a camshaft with a carrier shaft can first comprise the provision of a multiple cam element with at least two cams, wherein the multiple cam element is connected to the adjusting member in an axially adjacent arrangement, and wherein the multiple cam element preferably comprises an end-face jointing section, which is introduced and in particular pressed into the receiving bore of the adjusting member. For the method, provision can further be made such that the adjusting member comprises a radially circumferential jointing tongue at least on one end face, and the multiple cam element comprises a jointing groove, wherein in a method step the jointing tongue is introduced and in particular pressed into the jointing groove for the connection of the multiple cam element to the adjusting member.

If use is made of a multiple cam element, it may be sufficient for an inner toothing to be provided only on the inside in the multiple cam elements, wherein for example an inner toothing does not need to be introduced into the adjusting member. Furthermore, it is possible for the inner toothing not to extend over the entire length of the multiple cam, but to be constituted only on partial regions. In particular, the adjusting member can comprise a through-bore, which is larger than the through-bore in one or in two multiple cam elements fitted on the adjusting member, in particular because the adjusting member has a receiving bore with a large diameter, into which the jointing section of the multiple cam element or elements is inserted. Consequently, latching grooves can also preferably be introduced on the inside into at least one multiple cam element, so that the adjusting member is disposed for example only adjacent to one multiple cam element or serves as a connecting member between two multiple cam elements extending in a common shaft axis. If two multiple cam elements are provided, it can also be decided whether the inner toothing and/or the latching grooves are introduced before the jointing of the multiple cam elements with the adjusting member or whether the multiple cam elements are first connected to the adjusting member, and the inner toothing and/or the latching groove is then introduced by machining, for example in a single tool clamping.

BRIEF DESCRIPTION OF THE SEVERAL VIEWS OF THE DRAWING

Further features improving the invention are represented in greater detail below with the aid of the figures, together with the description of preferred examples of embodiment of the invention. In the figures.

DESCRIPTION OF THE INVENTION

Figure 1:
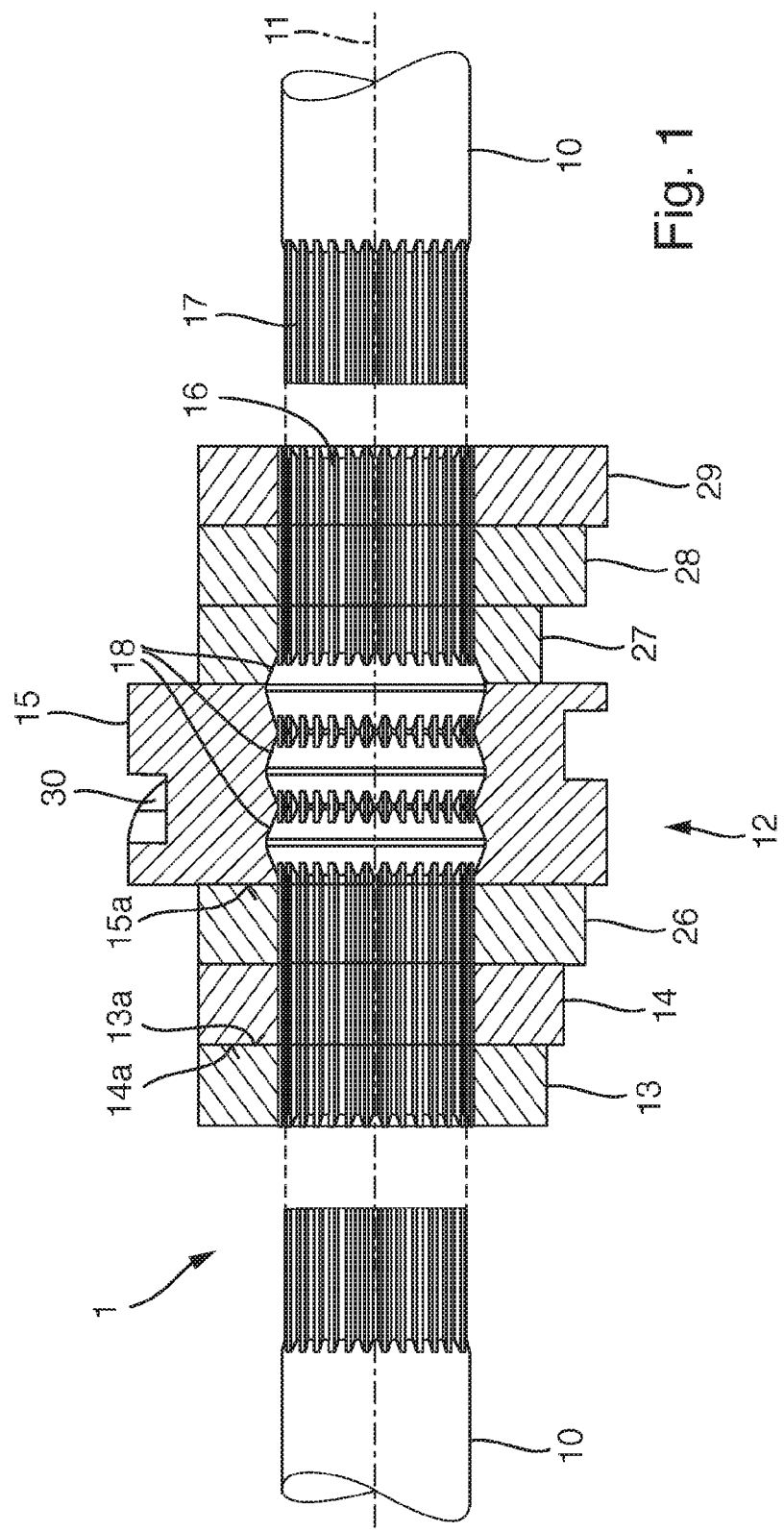
FIG. 1 shows a cross-sectional view through a camshaft with a cam pack, which is constituted with the features of the present invention.

FIG. 1 shows an example of embodiment of a camshaft 1 with a cam pack 12, which is constituted with the features of the present invention. Camshaft 1 comprises a carrier shaft 10, which is shown interrupted in the seating region of cam pack 12. Carrier shaft 10 can be mounted rotatably in a shaft axis 11, for example in the cylinder head of an internal combustion engine.

Cam pack 12 comprises for example six cams 13, 14, 26, 27, 28 and 29, wherein an adjusting member 15 is provided, and a groove guide 30 is introduced in adjusting member 15 on the outer periphery of the adjusting member 15. Cams 13, 14 and 26 are located on a first side of adjusting member 15, and cams 27, 28 and 29 are located on an opposite, second side of adjusting member 15. A through-bore, through which carrier shaft 10 is passed, extends through cams 13, 14, 26, 27, 28, 29 and through adjusting member 15. An inner toothing 16 is introduced in this through-bore formed by the individual components of cam pack 12, said inner toothing engaging with an outer toothing 17 on carrier shaft 10 in an axially displaceable and torque-transmitting manner. Outer toothing 17 of carrier shaft 10 is constituted wider in the direction of shaft axis 11 than the width of cam pack 12, and cam pack 12 can be adjusted axially in the direction of the shaft axis, whereby an adjusting element is guided in groove guide 30 of adjusting member 15. As a result of the form-fit connection of inner toothing 16 and outer toothing 17, a rotary motion of the carrier shaft 10 is at the same time transmitted to cam pack 12.

Cams 13, 14, 26, 27, 28, 29 and adjusting member 15 are connected to one another in an axially adjacent arrangement with one another, so that, as a result of the connection of these components of cam pack 12 via their respective end faces constituted in the axial direction, a composite structure is created which forms cam pack 12. According to the invention, this does not require a carrier tube on which the individual components such as cams 13, 14, 26, 27, 28, 29 and adjusting member 15 have to be disposed. Inner toothing 16 and latching grooves 18 can thus be introduced directly into cams 13, 14, 26, 27, 28, 29 and into adjusting member 15, wherein for example three latching grooves 18 are introduced on the inside into adjusting member 15, which are able to cooperate with a latching means for the axial latching of cam pack 12, said latching means being disposed in carrier shaft 10 in a manner not shown in detail.

Cams 13, 14, 26, 27, 28, 29 each have different cam contours, for example cams 13, 14, 26, 27, 28, 29 can have different cam lobes or the cam lobes are constituted at different angles around the circumference. As a result of the axial adjustability of cam pack 12, tappets having a fixed axial position can cooperate with different cams 13, 14, 26 or 27, 28, 29, in order for example to change the valve lift, but also for example to change the valve control times.

Figure 2:
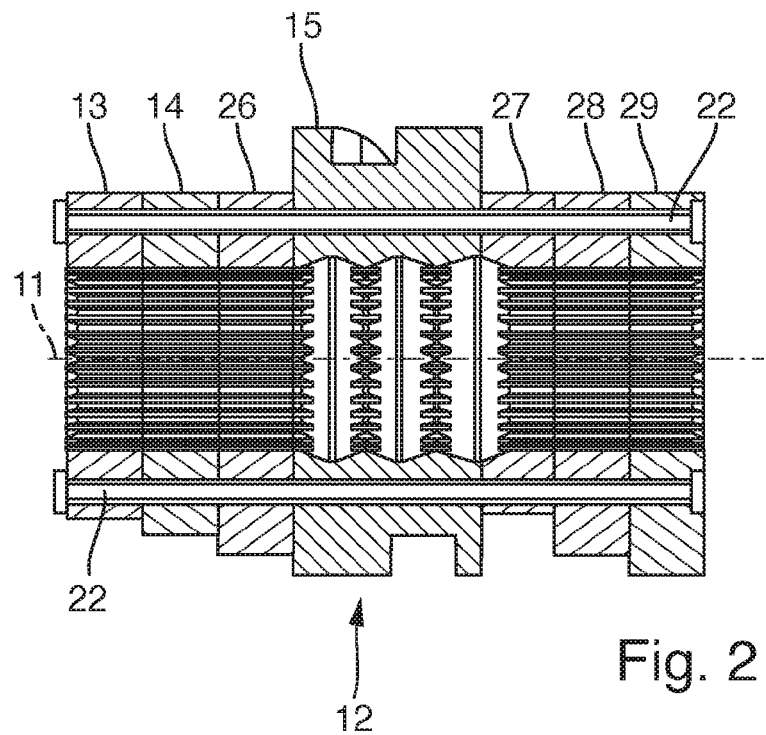
FIG. 2 shows a cross-sectional view of a cam pack according to a first example of embodiment for the formation of the connections between the cams and the adjusting member.

FIG. 2 shows a first example of embodiment for the formation of the composite structure of cams 13, 14, 26, 27, 28, 29 and adjusting member 15. The connection is constituted by tie rods 22, and by way of example two tie rods 22 are represented over the periphery of cam pack 12, wherein in particular more than two tie rods 22 can be provided, which are disposed uniformly distributed on the periphery of cam pack 12. Tie rods 22 extend parallel to shaft axis 11 through cams 13, 14, 26, 27, 28, 29 and adjusting member 15 and are placed under axial tensile stress. The components of cam pack 12 are thus pressed against one another at the end faces in order to form a mechanically loadable composite structure. Tie rods 22 can be constituted as screw elements or as dowel pins, in order to introduce a tensile stress into tie rods 22.

Figure 3:
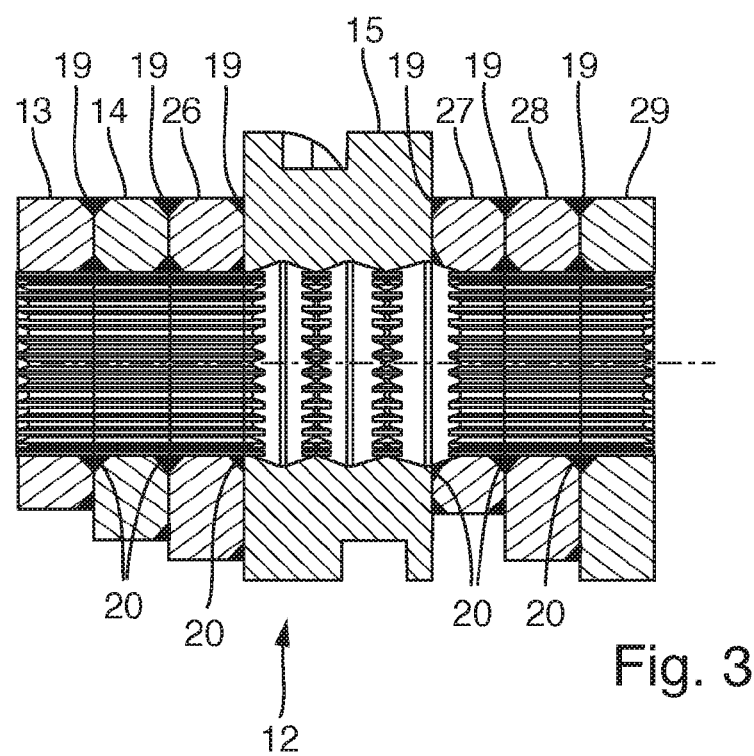
FIG. 3 shows a cross-sectional view of a cam pack according to a second example of embodiment for the formation of the connections between the cams and the adjusting member.

FIG. 3 shows a further example of embodiment for the formation of cam pack 12, wherein the connections between cams 13, 14, 26, 27, 28, 29 and adjusting member 15 are constituted by weld joints 19, 20. Weld joints 19 are constituted as weld joints on the outer periphery and weld joints 20 are constituted as weld joints on the inner periphery. Weld joints 19 and 20 constituted on the outer periphery and on the inner periphery are shown merely by way of example, wherein for example only weld joints 20 on the inner periphery may be sufficient to form a mechanically loadable composite structure of the components of cam pack 12. Weld joints 19 and 20 can be produced for example by laser beam welding procedures or by electron beam welding procedures, in order to minimize the thermal effect on cams 13, 14, 26, 27, 28, 29 and adjusting member 15.

Figure 4:
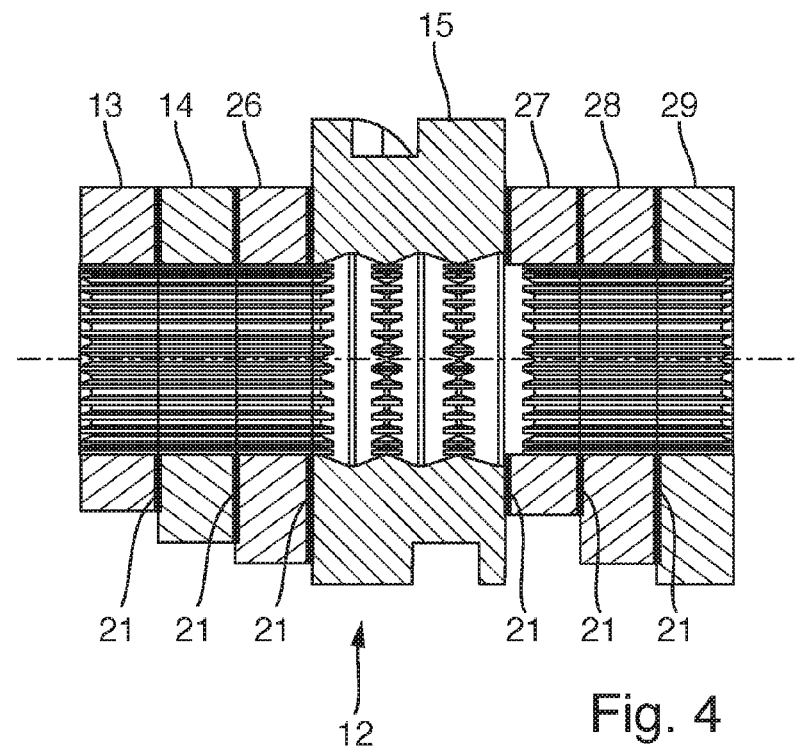
FIG. 4 shows a cross-sectional view of a cam pack according to a further example of embodiment for the formation of the connections between the cams and the adjusting member.

FIG. 4 shows a further example of embodiment for the formation of cam pack 12, wherein cams 13, 14, 26, 27, 28, 29 are connected to one another and adjusting member 15 to adjacent cams 26, 27 by solder joints 21. Solder joints 21 can be prepared for example by soldering foils, which are disposed between the individual components of cam pack 12 and, after the arrangement of cams 13, 14, 26, 27, 28, 29 and adjusting member 15 in an axially adjacent arrangement with respect to one another, cam pack 12 thus prepared can be brought to the solder melting temperature in order to finish solder joints 21. As an alternative to shown solder joints 21, adhesive joints can be provided between the components of cam pack 12.

Figure 5:
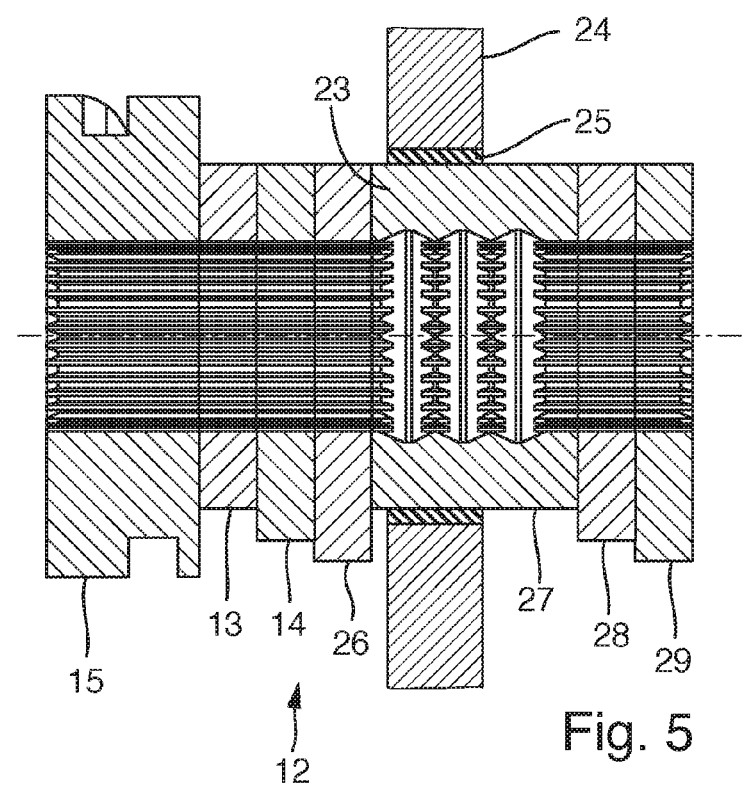
FIG. 5 shows a further example of embodiment of a cam pack, which comprises a bearing element for the mounting in a bearing.

Finally, FIG. 5 shows a further embodiment of a cam pack 12 with an adjusting member 15 and cams 13, 14, 26, 27', 28, 29, wherein cam 27' is also constituted as a bearing element 23. The cam 27' is constituted as a zero-lift cam and has a cylindrical outer circumference. Besides the tapping—not shown in detail—by means of a tappet for the valve control, cam pack 12 is mounted in a bearing block 24, into which a bearing 25 is introduced. Cam 27' thus performs both as a zero-lift function for the valve control as well as the function for the bearing of cam pack 12. The connection between the components of cam pack 12 can be constituted according to the example of embodiment in FIG. 2, in FIG. 3 or in FIG. 4.

As a result, a cam pack 12 is created which can be constituted without the use of a carrier tube. Furthermore, the possibility remains of feeding the different components of cam pack 12 in each case individually to mechanical and/or thermal processing steps, the components only then being connected to one another to form a cam pack 12.

Inner toothing 16, which is introduced into cams 13, 14, 26, 27, 28, 29 and into adjusting member 15, can be introduced individually into the respective components before the creation of the jointing connections or inner toothing 16 is introduced into cam pack 12 when the jointing connections between the individual components have already been created.

Figure 6:
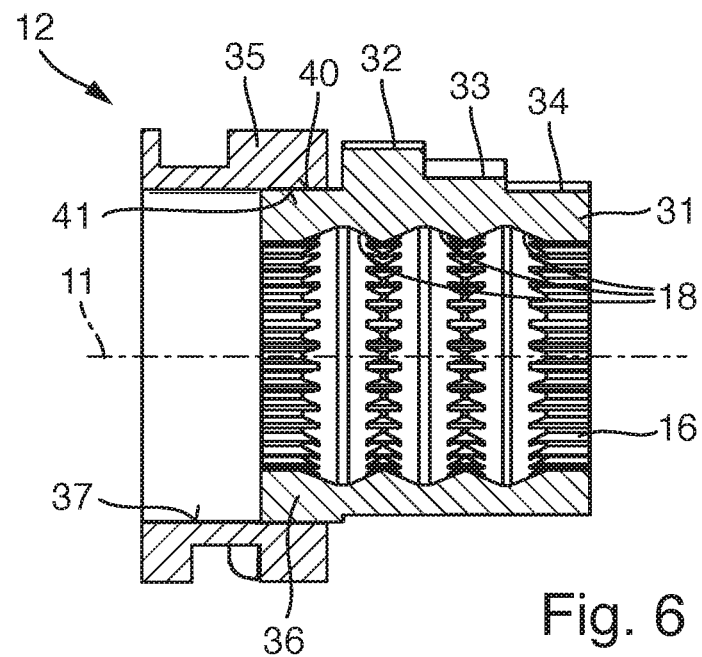
FIG. 6 shows a further example of embodiment of a cam pack, which comprises a multiple cam element and an adjusting member.
Figure 7:
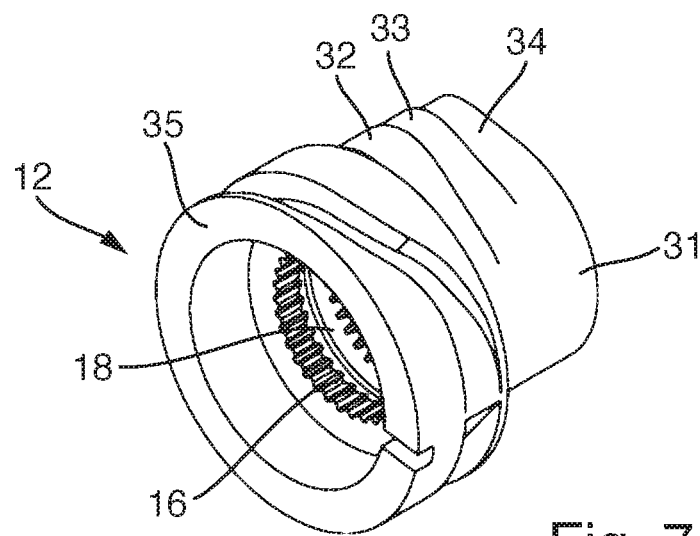
FIG. 7 shows the example of embodiment of the cam pack according to FIG. 6 in a perspective view.

FIG. 6 shows a cross-sectional view and FIG. 7 a perspective view of a cam pack 12 according to a further example of embodiment. Cam pack 12 comprises a multiple cam element 31, and cams 32, 33 and 34 with different cam profiles are constituted on the outer periphery of multiple cam element 31. Multiple cam element 31 comprises a central through-hole along shaft axis 11 in which an inner toothing 16 is introduced, which can be engaged with an outer toothing 17 of carrier shaft 10, see in this regard FIG. 1. It is shown that inner toothing 16 is not constituted continuously in multiple cam element 31, but rather inner toothing 16 extends only over sections in respect of shaft axis 11. Latching grooves 18 are introduced between the sections of inner toothing 16, said latching grooves being able to cooperate with a latching means for the axial latching of cam pack 12, said latching means being able to be accommodated in carrier shaft 10 in a manner not shown in detail.

Multiple cam element 31 is shown in an adjacent arrangement with respect to an adjusting member 35 and is connected to the latter. For the connection between multiple cam element 31 and adjusting member 35, multiple cam element 31 comprises a jointing section 36, by means of which a circumferential cylindrical connecting surface 40 is formed on the outside. Furthermore, adjusting member 35 comprises a receiving bore 37 with a connecting surface 41. Jointing section 36 is introduced, for example pressed, into receiving bore 37. In a manner not shown in detail, jointing section 36 can alternatively or additionally be welded, soldered or glued in receiving bore 37, in order to create a mechanically loadable connection between multiple cam element 31 and adjusting member 35.

Figure 8:
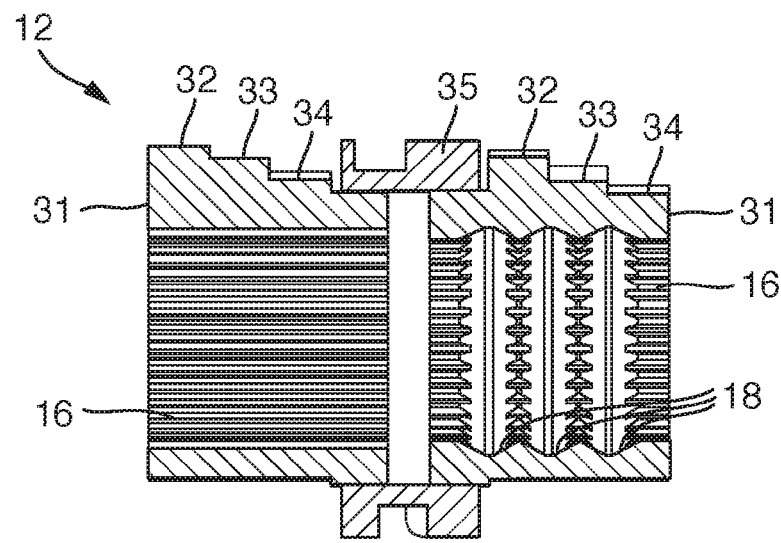
FIG. 8 shows a further example of embodiment of a cam pack comprising two multiple cam elements and an adjusting member.
Figure 9:
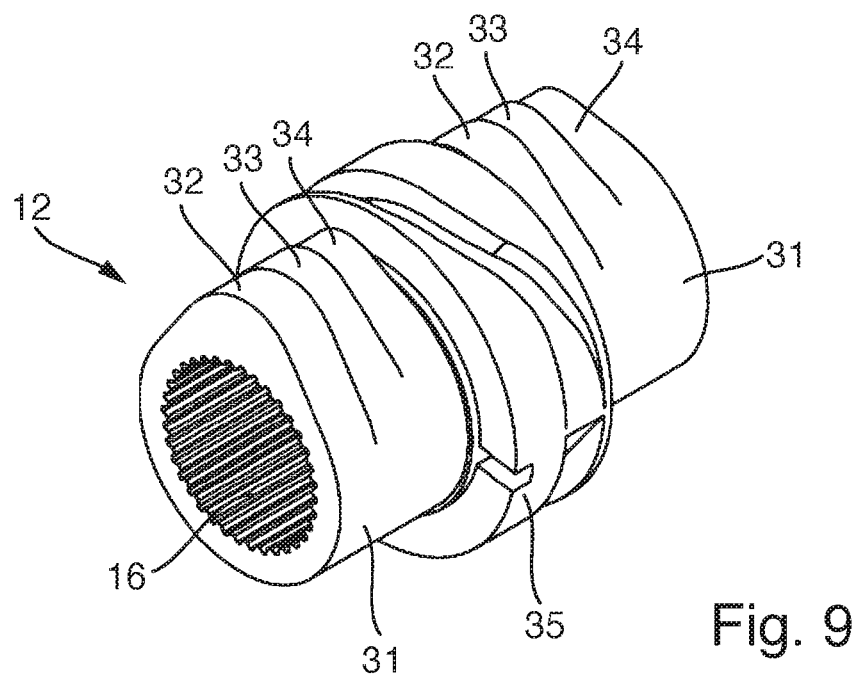
FIG. 9 shows the example of embodiment of a cam pack according to FIG. 8 in a perspective view.

FIGS. 8 and 9 show a further example of embodiment of a cam pack 12 in a cross-sectional view and in a perspective view. The example of embodiment comprises two multiple cam elements 31, and cams 32, 33 and 34 are constituted in each case on the outer periphery of multiple cam elements 31. Both multiple cam elements 31 are connected to adjusting member 35, wherein the connection is carried out in the same way as already shown and described by FIG. 6.

Multiple cam elements 31 comprise an inner toothing 16 on the inside, wherein for example multiple cam element 31 represented to the right of adjusting member 35 also comprises three latching grooves 18, as a result of which an interruption of inner toothing 16 again results, whereas multiple cam element 31 disposed to the left of adjusting member 35 comprises a continuous inner toothing 16 along shaft axis 11. The two multiple cam elements 35 are pressed, for example, into the receiving bore of the adjusting member lying opposite one another.

Figure 10:
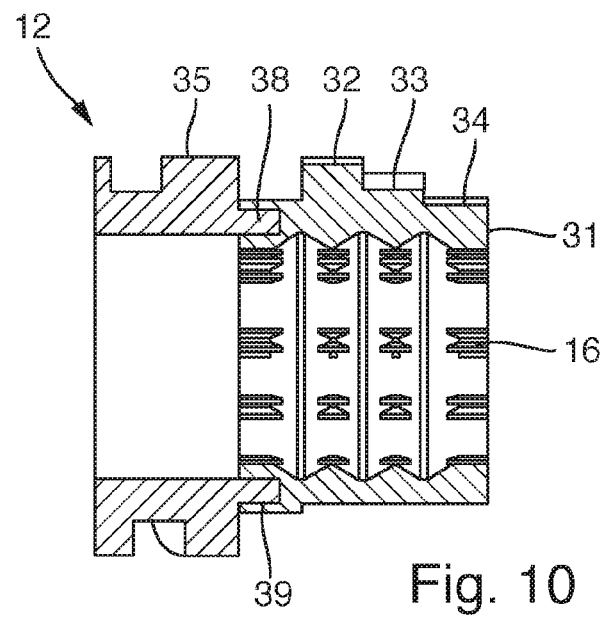
FIG. 10 shows an example of embodiment of a cam pack with a multiple cam element, which is connected to the adjusting member by means of a jointing tongue
Figure 11:
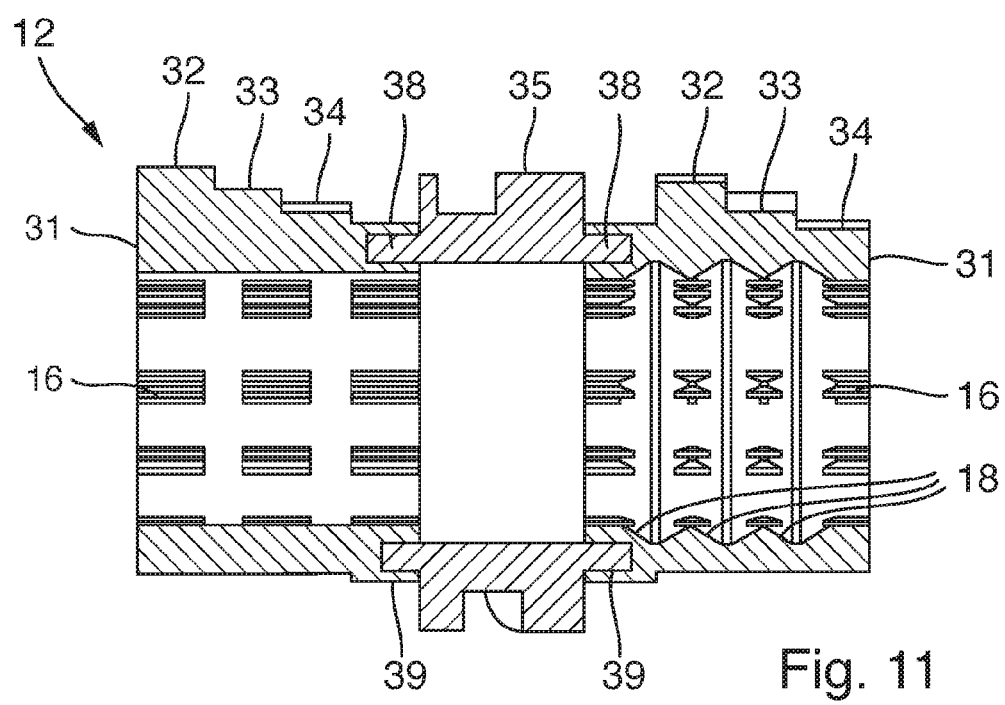
FIG. 11 shows a further example of embodiment of a cam pack with two multiple cam elements, which are each connected to the adjusting member by means of a jointing tongue.

FIGS. 10 and 11 show further examples of embodiment of cam packs 12, and FIG. 10 shows an example of embodiment with an adjusting member 35, to which only one multiple cam element 31 is fitted. FIG. 11, on the other hand, shows an example of embodiment with an adjusting member 35, and a first multiple cam element 31 is disposed on a first side and a further multiple cam element 31 is disposed on an opposite, second side of adjusting member 35. All multiple cam elements 31 comprise cams 32, 33 and 34 on their outer periphery, an inner toothing 16 being shown on the inside of multiple cam elements 31, said inner toothing comprising a plurality of interruptions in the circumferential direction. Multiple cam elements 31 shown in FIG. 11 on the right-hand side of adjusting member 35 also comprises latching grooves 16.

The connection between adjusting members 35 and multiple cam elements 31 in FIGS. 10 and 11 is constituted by a tongue-and-groove system. Adjusting members 35 comprise jointing tongues 38 disposed on the end faces, said jointing tongues engaging in circumferential jointing grooves 39 and being introduced into multiple cam elements 31 likewise on the end faces. Jointing tongues 38 and jointing grooves 39 can be constituted around the entire circumference or jointing tongues 38 and jointing grooves 39 are disposed over limited segments on the periphery of adjusting member 35 and of multiple cam elements 31.

The holding arrangement of jointing tongues 38 in jointing grooves 39 can be carried out by pressing jointing tongues 38 into jointing grooves 39, wherein welding, soldering or adhesion of jointing tongues 38 in jointing grooves 39 can also be provided after the jointing of jointing tongues 38 in jointing grooves 39. In particular, weld joints between jointing tongues 38 and jointing grooves 39 can be produced particularly advantageously by means of a laser beam capillary welding procedure, without thermal distortion being created in the formed cam pack 12, since the heat input into the component is minimal due to the use of a laser beam as a heat source for the welding.

The invention is not limited in its implementation to the aforementioned preferred examples of embodiment. On the contrary, a number of variants are conceivable, which make use of the presented solution even with fundamentally different embodiments. All the features and/or advantages emerging from the claims, the description or the drawings, including structural details or spatial arrangements, may be essential to the invention both in themselves and as well as in the most varied combinations.

LIST OF REFERENCE NUMBERS

1 camshaft
10 carrier shaft
11 shaft axis
12 cam pack
13 cam, 13a end face
14 cam, 14a end face
15 adjusting member, 15a end face
16 inner toothing
17 outer toothing
18 latching groove
19 weld joint on the outer periphery
20 weld joint on the inner periphery
21 solder joint
22 tie rod
23 bearing element
24 bearing block
25 bearing
26 cam
27 cam
27' cam
28 cam
29 cam
30 groove guide
31 multiple cam element
32 cam
33 cam
34 cam
35 adjusting member
36 jointing section
37 receiving bore
38 jointing tongue
39 jointing groove
40 connecting surface
41 connecting surface

The invention claimed is:

1. A camshaft, comprising:
   a carrier shaft configured to be mounted for rotation along a shaft axis, said carrier shaft having an outer toothing;
   at least one cam pack configured to be axially displaced on said carrier shaft, said at least one cam pack including at least two cams and at least one adjusting member configured to axially adjust said at least one cam pack;
   said cams and said at least one adjusting member connected to one another in an axially adjacent configuration and configured to be mounted for axially displacement as a composite structure in a direct configuration on said carrier shaft;
   said cams and said at least one adjusting member having a through-bore extending through and defined by said cams and said at least one adjusting member, said carrier shaft passing through said through-bore, said through-bore having an inner toothing engaging with said outer toothing in an axially displaceable and torque-transmitting manner;
   at least one multiple cam element having said at least two cams, said at least one adjusting member being an adjusting member connected to said at least one multiple cam element at a connection in an axially adjacent configuration, said multiple cam element including a jointing section configured to be at least one of introduced into a receiving bore of said adjusting member or pushed onto a receiving section of said adjusting member.

2. The camshaft according to claim 1, wherein said cams and said at least one adjusting member have end faces, and said cams and said at least one adjusting member are connected to one another by connections at least over partial regions of said respective end faces.

3. The camshaft according to claim 2, wherein said connections of said cams and said at least one adjusting member and cams disposed adjacent said at least one adjusting member include at least one tie rod extending through said cams and said at least one adjusting member.

4. The camshaft according to claim 2, wherein said connections are firmly bonded connections.

5. The camshaft according to claim 4, wherein said firmly bonded connections are weld joints.

6. The camshaft according to claim 5, wherein said weld joints are disposed on at least one of outer peripheries or inner peripheries of said cams and said at least one adjusting member.

7. The camshaft according to claim 4, wherein said firmly bonded connections between said cams and said at least one adjusting member and cams disposed adjacent said at least one adjusting member are solder joints or adhesive joints.

8. The camshaft according to claim 1, wherein said adjusting member has end faces and a jointing tongue at least on one of said end faces, and said multiple cam element has at least one jointing groove into which said jointing tongue is configured to be introduced to connect said multiple cam element to said adjusting member.

9. The camshaft according to claim 8, wherein said jointing tongue is a radially circumferential jointing tongue.

10. The camshaft according to claim 8, wherein said connection between said jointing tongue and said jointing groove is a compression joint.

11. The camshaft according to claim 1, wherein said connection between said multiple cam element and said adjusting member includes a compression joint, a weld joint, a solder joint or an adhesive joint.

12. The camshaft according to claim 1, wherein said connection between said jointing section and said receiving bore is a compression joint.

13. A cam pack, comprising:
   at least two cams; and
   at least one adjusting member configured to axial adjust the cam pack on a carrier shaft;
   said cams and said at least one adjusting member connected to one another in an axially adjacent configuration and forming a composite structure for direct configuration on the carrier shaft;
   said cams and said at least one adjusting member having a through-bore extending through and defined by said cams and said at least one adjusting member, said carrier shaft passing through said through bore, said through-bore having an inner toothing engaging with an outer toothing on the carrier shaft in an axially displaceable and torque-transmitting manner;
   at least one multiple cam element having said at least two cams, said at least one adjusting member being an adjusting member connected to said at least one multiple cam element at a connection in an axially adjacent configuration, said multiple cam element including a jointing section configured to be at least one of introduced into a receiving bore of said adjusting member or pushed onto a receiving section of said adjusting member.

14. A method for producing a camshaft, the method comprising the following steps:
   providing a carrier shaft configured to be mounted for rotation along a shaft axis;
   providing a cam pack including at least two cams and at least one adjusting member configured to axially adjust the cam pack;
   placing the cam pack axially displaceably on the carrier shaft; and
   mutually joining the at least two cams and the at least one adjusting member and adjacent cams of the at least two cams disposed adjacent the at least one adjusting member in an axially adjacent configuration and as a composite structure in a direct configuration on the carrier shaft;
   forming an inner toothing into the at least two cams and into the at least one adjusting member,
   engaging the inner toothing with an outer toothing on the carrier shaft in an axially displaceable manner;
   providing a multiple cam element having the at least two cams; and
   providing the at least one adjusting member as an adjusting member connected to the multiple cam element in an axially adjacent configuration;
   providing the multiple cam element with an end-face jointing section, and introducing the end-face jointing section into a receiving bore of the adjusting member;
   pressing the end-face jointing section into the receiving bore.

15. The method according to claim 14, which further comprises carrying out the step of forming the inner toothing into the at least two cams and into the adjusting member individually, and then carrying out the step of mutually joining the at least two cams and the at least one adjusting member in the axially adjacent configuration.

16. The method according to claim 14, which further comprises carrying out the step of mutually joining the at least two cams and the adjusting member in the axially adjacent configuration, and then carrying out the step of forming the inner toothing into the at least two cams and into the adjusting member.

* * * * *

UNITED STATES PATENT AND TRADEMARK OFFICE
CERTIFICATE OF CORRECTION

PATENT NO.         : 9,534,674 B2                     Page 1 of 1
APPLICATION NO.    : 14/130100
DATED              : January 3, 2017
INVENTOR(S)        : Thomas Binder et al.

It is certified that error appears in the above-identified patent and that said Letters Patent is hereby corrected as shown below:

(73) Assignee should read: Thyssenkrupp Presta Teccenter AG, Eschen (LI)

Signed and Sealed this
Fourteenth Day of March, 2017

Michelle K. Lee
*Director of the United States Patent and Trademark Office*